United States Patent Office 2,987,274
Patented June 6, 1961

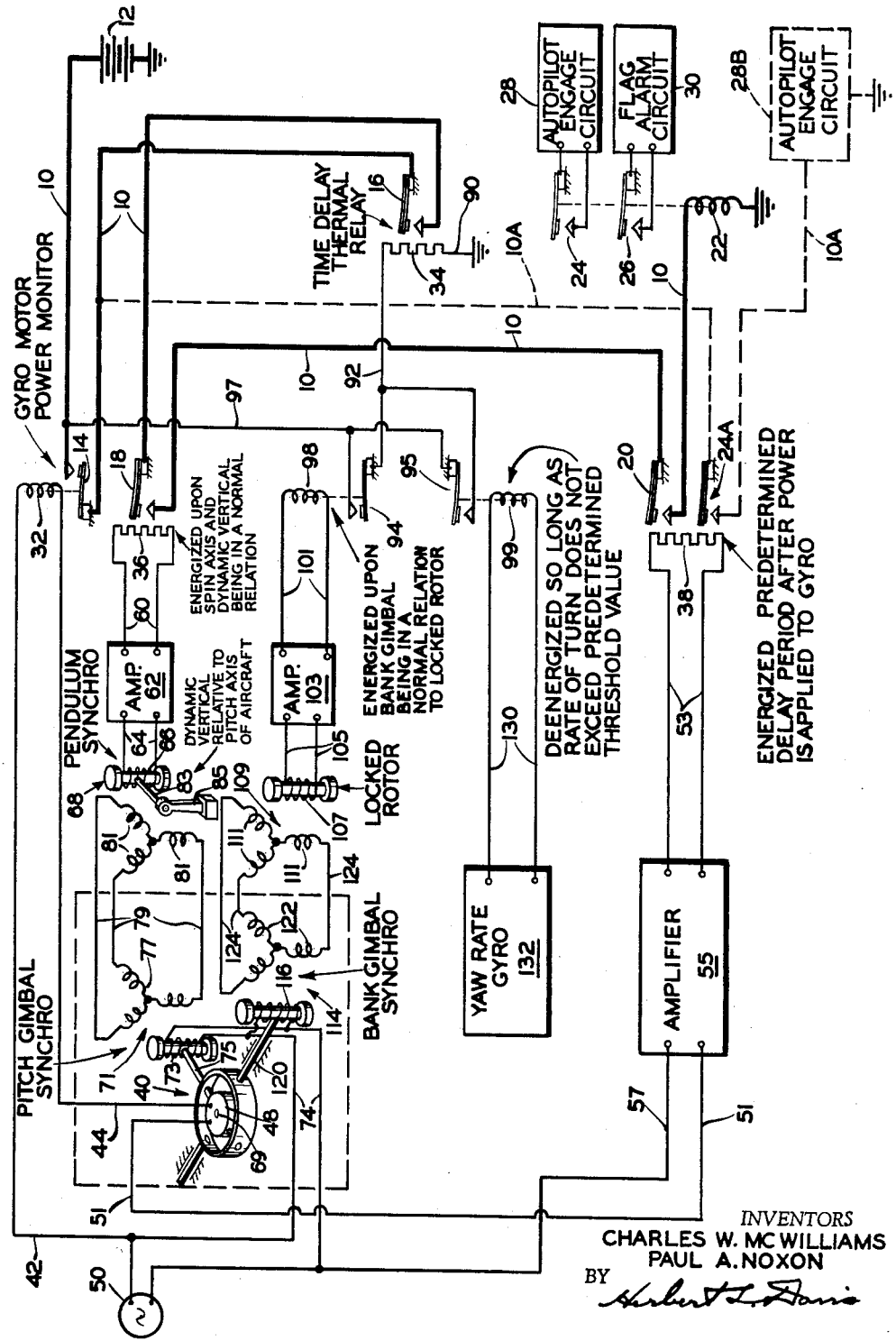

2,987,274
VERTICAL GYRO MONITOR SYSTEM
Charles W. McWilliams, Allendale, and Paul A. Noxon, Tenafly, N.J., assignors to The Bendix Corporation, a corporation of Delaware
Filed Mar. 31, 1958, Ser. No. 725,139
14 Claims. (Cl. 244—77)

The invention relates to a vertical gyro monitor system which detects malfunctions in units affecting verticality of a gyro reference and produces an alarm indication.

Most modern self-contained vertical reference systems which serve as a source of pitch and bank attitude signals for aircraft instruments, navigation equipment, flight directors, and autopilots are located remote from their associated panel mounted horizon indicators. The fact that these systems are remote from the servoed indicating instrument and that they are in many instances the sole source of vertical information for a large number of instruments and navigation equipment units, imposes on the gyro reference a requirement for extreme reliability. Proper design of equipment and good quality control in production are not considered enough to ensure the degree of reliability desired. It is desirable and in many cases necessary to monitor certain aspects of gyro performance for the purpose of giving an alarm to the pilot in the event a malfunction is detected. Such an alarm, indicating malfunction, is necessary both during the initial warm-up and erection cycle on the ground before take-off so as to ensure gyro flight readiness, as well as during flight to determine if the vertical reference is satisfactory.

The alarm to the pilot may be in the form of a flag which appears on the face of the horizon indicator as disclosed in copending U.S. application Serial No. 622,222, filed November 14, 1956, now Patent No. 2,950,460 by Paul E. Seifried and William V. Henrich, and assigned to Bendix Aviation Corporation, assignee of the present application. Also, the operated device may be in the form of a light or other visual indicator or a bell, siren or other form of audible alarm. In the event of some types of malfunction, it would be desirable to disconnect the autopilot from the aircraft as well as provide the alarm indication to the pilot. Therefore, it is desirable for the monitor to be capable of both alarm indication and autopilot disconnection.

In general it would be highly desirable to directly monitor the vertical accuracy of the gyro. This can be done quite readily while the aircraft, using the gyro, is on the ground or in level, unaccelerated flight, since vertical information would be available and be reliable. This cannot be done directly or instantaneously in an aircraft under practical flight conditions during which turbulence, command maneuvers, and acceleration exist, unless there is a second source of vertical information which indicates true vertical under all flight conditions.

In most vertical systems the available secondary information is dynamic vertical rather than true vertical. Hence, it follows that the basic monitoring approach must be to compare gyro attitude or gimbal signals with dynamic vertical signals. In addition, since most current vertical reference systems utilize a yaw-rate erection cut-out switch, information from that device can also be used in the monitor system.

There are two other sources of information available on many modern vertical reference systems which are electrically operated. The first source is the gyro motor power monitor. In the event current is not being supplied to the motor due to loss of power supply, open slip ring, open motor lead, etc. an alarm relay is activated which in turn operates the alarm flag or other indicator. This applies to either three phase or single phase motor arrangements. The second source is the time interval information available in electrical quick erecting gyro systems. The erection sequence may be divided into two or three intervals depending on the type of erection scheme utilized. In any event the total period is usually in the order of one minute. At the end of this period the gyro should be reasonably close to vertical and the gyro motor should be up to sufficient speed so as to enable the gyro to be a useable reference.

An object of the invention, therefore, is to provide a novel vertical gyro monitor system which utilizes gyro gimbal position information, dynamic vertical information, yaw rate switch on-off information, power to gyro motor time interval information, a gyro motor current on-off information. Using this information there has been provided novel means in the monitor system for determining flight readiness of the gyro reference system immediately after the initial erection cycle and before take-off of the aircraft. In addition, there has been provided novel means for effecting in-flight monitoring of many essential gyro functions to a high degree of reliability with a negligible amount of potential nuisance alarms and disconnects.

Another object of the invention is to provide a vertical gyro monitor system which monitors several functions before indicating (flag drops) that the gyro is ready and a useable reference for aircraft take-off.

Another object of the invention is to provide a vertical gyro monitor system in which required conditions to render the monitor system effective to indicate gyro readiness, after initial erection, and to permit the alarm flag to disappear are as follows:

(1) A one minute time interval must elapse starting from the moment of power application.
(2) Presence of current in all leads of gyro motor rotor.
(3) Both the pitch and the bank gimbal must be very close to a vertical position.
(4) The monitor system must be operating properly.

The presence of current in all leads of the gyro motor rotor assures that the gyro motor is receiving proper power, and that it should be accelerating toward top speed. The one minute time interval condition, in addition to assuring sufficient time for the initial erection cycle to be complete, in conjunction with the gyro motor current monitor assures that the gyro will be up to sufficient speed so as to be a useable vertical reference. Both pitch and bank gimbal positions are compared with their respective dynamic vertical measuring units on each axis, to determine when they are within a few degrees of vertical. This operation not only assures accurate performance of the erection system, but is a check on the monitor operation itself. Hence, the pilot knows that the monitor is working and is ready for in-flight monitoring.

Another object of the invention is to provide a vertical gyro monitor system in which during actual aircraft flight the monitoring is similar in some respects and different in others from that prior to aircraft take-off, in that lack of current in any or all leads of the gyro motor rotor and pitch gimbal departure from vertical by more than a few degrees, are still two conditions which individually will result in a flag or alarm indication. However, due to vibration and sustained accelerations in normal flight, an alarm upon pitch gimbal departure will occur only after a predetermined time delay, in order to prevent nuisance alarms or disconnects. Further, the arrangement is such that the monitor is equally effective at normal, but sustained climbing or descending flight angles as it is in level flight.

Another object of the invention is to provide a vertical gyro monitor system in which other conditions for effecting a flag or alarm indication during actual flight are concerned with bank gimbal error, bank dynamic vertical, and behavior of the yaw rate switch and in which the bank monitor is so designed as to compare either bank gimbal angle or the angle between dynamic vertical direction and gyro spin axis with the rate switch position.

Although either of the two angles could be used for monitoring purposes, throughout this description the angle compared to the rate switch position will be referred to as the bank angle. In the normal flight regime of an aircraft over the speed range, there is a minimum bank angle (hereafter referred to as the threshold bank angle) above which during normal turns the rate switch will always operate (more to the cut-out position). Operation of the rate switch during turns with a bank angle at or above the threshold would indicate normal operation of all equipment. If a bank angle persists equal or above the value of the threshold bank angle for a period greater than the normal time delay built into the rate switch, and the rate switch does not operate, a malfunction of the equipment would be the cause. Either the gyro, the rate switch or the coupling between the two would be at fault.

A value of bank angle is selected below which a flag alarm will not be given regardless of the behavior of the rate switch. Once a bank gimbal angle exceeds the threshold, however, and the rate switch does not operate, a flag alarm is indicated. If the rate switch does operate no alarm is indicated. The value of the bank angle threshold is chosen so that any maneuver at any airspeed which calls for and achieves this bank angle, the rate of turn will be such as to be above the threshold of the yaw rate switch. Hence, bank angle signals from the gyro above the threshold bank angle not accompanied by rate switch operation represents an abnormal condition requiring an alarm. Such a condition means either the bank angle signal or erection system of the vertical gyro is malfunctioning or that the rate switch has failed in the inoperative position. Either condition results in an alarm indication. As in the case of the pitch monitoring, a time delay element is inserted after the bank attitude signal and rate switch position signal are compared. This delay is necessary because of the delay built into the yaw rate switch. In both pitch and bank the slow-over type of failures resulting from vertical erection signals or loss of erection signal will be detected in time to give an alarm before the aircraft is in difficulty.

A further object of the invention is to provide a monitor system which utilizes the threshold bank angle, as hereinbefore defined, in which the monitor system operation is such that if the bank angle equals or exceeds the threshold angle for a period of time equal or greater than the time delay of rate switch and the rate switch does not operate, a flag or other alarm indication is effected and in which if the rate switch does operate no alarm is given.

An additional object of the invention is to provide a monitor system in which during level flight controlled operation to a fixed heading or track, either during autopilot or manual operation, the monitor will initiate a flag alarm if there is an erection system failure due, for example, to a hard-over erection signal, loss of erection signal, loss of motor excitation, loss of power, as well as any failure of rate switch, which in turn results in loss of erection signals and any of which malfunctions result in a bank slow-over type of failure or as in the case of the gyro motor power monitor, an impeding erection failure due to a slow decrease of gyro speed and hence angular momentum.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

The drawing is a schematic circuit diagram of the vertical gyro monitoring system.

Referring to the drawing there is indicated by numeral 10 an alarm and autopilot engage main control circuit energized by a source of electrical energy 12 connected through relay switches 14, 16, 18 and 20 to an electromagnetic winding 22 for operating relay cut-in switches 24 and 26 so as to effect operation of autopilot engage circuit 28 and render alarm circuit 30 ineffective to indicate a condition of alarm. The autopilot engage and alarm circuits 28 and 30 may be of a suitable type well known in the art.

The relay switches 14, 16, 18 and 20 are biased by a spring arm or other suitable means to a circuit open position. The relay switch 14 is biased to a circuit closed position upon energization of a suitable electromagnetic winding 32 while the switch arms 16, 18 and 20 may include suitable bimetallic elements so arranged as to actuate the respective switch arms 16, 18 and 20 to circuit closing positions in a time delay action upon energization of suitable heater elements 34, 36 and 38. Each of the heater elements upon energization cooperates with its respective switch arm 16, 18 and 20 to provide a time delay thermal relay of conventional type.

Current will flow in this alarm and autopilot engage main control circuit 10 when the appropriate contact control switch arms 14, 16, 18 and 20 of these relays are closed. Closed contacts and flow of current in the main control circuit 10 represents a normal condition upon proper operation of the vertical gyro indicated generally by the numeral 40. The opening of any one of the relay switch arms 14, 16, 18 and 20 will interrupt the current in the main control circuit 10 and hence cause the electromagnetic relay winding 22 to permit relay switch arms 24 and 26 to be biased under spring tension to an open position to prevent operation of the autopilot engage circuit 28 or cause disengagement of the same if the autopilot engage circuit is already engaged while causing the flag alarm or other suitable alarm circuit 30 to indicate a malfunctioning condition of the gyro 40.

*Gyro motor power monitor*

The relay including switch arm 14 and electromagnetic winding 32 is part of the gyro motor power monitor and the winding 32 is connected by conductors 42 and 44 in an electrical input to gyro motor 48 of the vertical gyro 40 so that the winding 32 is effectively energized so long as electrical power is being normally drawn by the gyro motor 48 from a source of alternating current indicated generally by numeral 50 and connected to the input lines 42, 44, 51 and 57 of the gyro motor 48. Upon such energization of electromagnetic winding 32 the relay switch arm 14 is held in a circuit closed position, but any interruption in the energizing current of the gyro motor 48 immediately removes power from the electromagnetic winding 32 causing the switch arm 14 to be biased under spring tension to a circuit open position whereupon the alarm circuit 30 is rendered effective to raise the flag alarm into an indicating position and the autopilot control circuit 28 is rendered effective to disengage the autopilot.

*Power to gyro-motor time interval monitor*

A time delay thermal relay including heater element 38 and bimetallic switch arm 20 senses a predetermined interval of time normally effective for operation of an erection sequence system for the gyro 40 which system may be of conventional type and therefore not shown herein. The heater element 38 is connected to output lines 53 leading from an amplifier 55 having input lines 51 and 57 connected in an electrical input to the gyro motor 48 of the vertical gyro 40 and so arranged that the amplifier 55 is effectively energized so long as electrical power is being normally drawn by the gyro motor 48 from the source of alternating current 50.

The heater element 38 and amplifier 55 are so arranged that the thermal relay switch arm 20 closes in a predetermined interval of time, for example, one minute after energization of the gyro motor 48 and an interval of time sufficient to assure that the erection timing cycle of the gyro 40 has been completed properly, whereupon the closing of the thermal relay switch arm 20, the electromagnetic relay winding 22 is normally energized and the switches 24 and 26 are closed to effect operation of the autopilot engage circuit 28 and cause the flag alarm indicating position.

However, any malfunction in the initial energization of the gyro motor 48 which prevents power from being properly applied to the heater element 38 or any later removal of power from the heater element 38 will result in the thermal relay switch arm 20 being biased by spring tension of the bimetallic arm 20 to open a switch contact and the alarm and autopilot engage control circuit 10 and hence result in an alarm indicating condition.

*Vertical gyro pitch monitor system*

A time delay thermal relay including heater element 36 and bimetallic switch arm 18 is part of a vertical gyro monitor system. The heater element 36 is connected across output lines 60 leading from an amplifier 62 having input lines 64 leading from a rotor winding 66 of a synchro 68 of the pitch monitor system, as hereinafter explained.

The arrangement of the amplifier 62 and heater element 36 is such that the heater element 36 is normally energized so as to hold the bimetallic switch arm 18 in a closed position so long as there is no sustained signal from the pitch monitor system to the amplifier 62 above a predetermined threshold value and generated in the system by a sustained angle in the plane of pitching motion between the spin axis 69 of the gyro 48 and the line of the dynamic vertical.

The synchro control system for detecting this sustained angle is shown schematically in the drawing and includes a pitch gimbal synchro 71 having a rotor winding 73 connected by electrical conductors 74 to the source of alternating current 50 and operatively positioned by a shaft 75 on the pitch axis of the gyro 40. The rotor winding 73 is inductively coupled to stator windings 77 connected by conductors 79 with stator windings 81 of the synchro 68. The rotor winding 66 of the synchro 68 is operatively positioned by a shaft 83 actuated by a weighted pendulum 85 upon change in the dynamic vertical relative to the pitch axis of the gyro 40 so that an output or error voltage is applied across the input lines 64 of the amplifier 62 which is a measure of the angle between the gyro spin axis as sensed by the rotor winding 73 of the pitch gimbal synchro 71 and the dynamic vertical as sensed by the rotor winding 66 of the pendulum synchro 68.

Normally, such angle and hence the error voltage applied across the input lines 64 to the amplifier 62 is small or null whereupon the arrangement of the amplifier 62 is such that electrical power is supplied through output lines 60 to the heater element 36 so as to hold the bimetallic thermal relay switch arm 18 in a closed position. However, when the angle exceeds a predetermined minimum range so as to cause the error voltage applied across the input lines 64 to the amplifier 62 to reach predetermined threshold value, the amplifier 62 in conventional manner is arranged to cut off the electrical power supplied through output lines 60 to the heater element 36 so that after a predetermined delay period (depending on dynamics of the specific aircraft) the bimetallic switch arm 18 will be biased by spring tension of the bimetallic switch arm 18 to open a switch contact and the alarm and autopilot engage control circuit 10 and hence result in an alarm indicating condition.

*Vertical gyro bank monitor system*

A time delay thermal relay including heater element 34 and bimetallic switch arm 16 is part of a vertical gyro bank monitor system. The heater element 34 is connected at one end through a grounded connector 90 to a grounded end of the source of electrical energy 12, while the opposite end of the heater element 34 may be connected by a conductor 92 through either a closed relay switch arm 94 or a closed relay switch arm 95 and a conductor 97 to that part of conductor 10 leading directly from the opposite end of the source of electrical energy 12.

The relay switch arms 94 and 95 are biased by a spring arm or other suitable means to circuit open positions. The relay switch arm 94 is biased to a circuit closed position upon energization of a suitable electromagnetic winding 98 while the relay switch arm 95 is biased to a circuit closed position upon energization of a suitable electromagnetic winding 99.

The heater element 34 is normally energized so long as either winding 98 or winding 99 is energized, since in that case either relay switch arm 94 or relay switch arm 95 will close a switch contact to conduct current from the D.C. source of electrical energy 12 so as to energize the heater element 34.

The electromagnetic winding 98 is connected across output lines 101 leading from an amplifier 103 having input lines 105 leading from a locked rotor or fixed winding 107 of a synchro 109 having inductively coupled thereto stator winding 111 of a bank monitor system, as hereinafter explained.

The arrangement of the amplifier 103 and electromagnetic winding 98 is such that the winding 98 is normally energized so as to hold the relay switch arm 94 in a closed position so long as there is no sustained signal from the bank monitor system to the amplifier 103 above a predetermined threshold value.

The synchro control system for generating such signal is shown schematically in the drawing and includes a bank gimbal synchro 114 having a rotor winding 116 connected by the electrical conductors 74 to the source of alternating current 50 and operatively positioned by a shaft 120 on the bank or roll axis of the gyro 40. The rotor winding 116 is inductively coupled to stator windings 122 connected by conductors 124 with stator windings 111 of the synchro 109. The fixed or locked rotor winding 107 is set at a predetermined null or normal bank position. In the event the actual bank angle as measured by the position of rotor winding 116 is excessive and exceeds the normal bank angle position, as set by the rotor winding 107, the resulting signal applied across the input lines 105 of the amplifier 103 exceeds a predetermined threshold value. The arrangement of the amplifier 103 is such that the application of an input signal thereto in excess of the predetermined threshold value causes the amplifier 103 to cut off the electrical power supplied through output lines 101 to the electromagnetic winding 98, whereupon the relay switch arm 94 under spring tension opens the switch contact controlled thereby.

The electromagnetic winding 99 controlling the other relay switch arm 95 is connected across output lines 130 leading from a yaw rate gyro of conventional type, indicated schematically in the drawing by the numeral 132. The yaw rate gyro 132 may operate a cut out switch for the erection system of the gyro 40 as disclosed and claimed in the copending U.S. application Serial No. 637,928, filed February 4, 1957 by Vincent A. Wilhelm and Harold Moreines, now U.S. Patent No. 2,875,619 granted March 3, 1959, and assigned to Bendix Aviation Corporation.

The yaw rate gyro 132 is also so arranged that upon a turn of the aircraft at a rate above a predetermined threshold value, there is applied by the yaw rate gyro 132 a signal voltage across the lines 130 causing energization of the electromagnetic winding 99 and closure of the relay switch arm 95 so as to in turn connect the heater 34 across the source of electrical energy 12 through lines 10, 97, 92 and 90. However, upon the rate of turn of the aircraft being below the predetermined threshold value, the yaw rate gyro 132 does not effect energization of the winding 99 and the switch arm 95 under spring tension is biased to an open position.

Thus, the switch arm 95 is normally open when the turning rate of the aircraft is below the threshold value of the yaw rate gyro 132, while the switch arm 94 is in an open position when the bank angle is in excess of its threshold value. Normally when the threshold bank angle is achieved, the aircraft will turn at a rate in excess of the threshold value of the yaw rate gyro 132 so that the switch arm 95 will be biased to a closed position by energization of the electromagnetic winding 99 controlled by the yaw rate gyro 132, but only after the inherent delay period of the gyro controlled relay switch 95—99 has elapsed. The thermal relay 16—34 is so arranged as to have a longer time delay than the time delay period of the relay switch 95—99. Hence, if the operation of the relay switch 95—99 by the yaw rate gyro 132 starts at or about the same time the switch arm 94 opens, the thermal relay 16—34 will not be de-energized long enough to cause switch arm 16 to open the main control circuit 10 for the autopilot engage and alarm circuits.

However, in the event the measured bank angle is above the bank angle threshold and the yaw rate gyro controlled switch 95 fails to operate, the relay switch 95 will remain open as well as the bank angle controlled relay switch 94, whereupon the thermal relay 16—34 after its delay period will cause switch arm 16 to open its contacts and the main control circuit 10 so that an alarm condition will result. This alarm condition could be due to a faulty gyro erection system for the gyro 40 and the effect thereof on the bank angle measured by the gyro 40 or to an inoperative yaw rate gyro cut in system. Further, as disclosed and claimed in the aforementioned U.S. Application Serial No. 637,928, filed February 4, 1957 by Vincent A. Wilhelm and Harold Moreines and Now U.S. Patent No. 2,875,619 granted March 3, 1959, the yaw rate gyro 132 may control the cut in of the gyro erection system for the gyro 40 so that a failure of the yaw rate gyro 132 would also eventually cause an alarm, since such failure would cause a cut off of the erection system for the gyro 40 which would in turn be detected by the bank or pitch erection monitor. Hence, it can be seen that operation of the yaw rate gyro 132 is fully monitored, as well as bank erection of the gyro 40.

In the illustrated system, the autopilot would be disengaged in the event of any alarm condition. This may not be desirable in every case. It may in some applications not be desirable to disengage the autopilot at all, or it may be desirable to disengage the autopilot for some alarm conditions and not for others. By way of further illustration, the switch 24 for controlling the autopilot engage circuit 28 may not be used and instead there may be provided a modified second thermal switch 24A operated by the heater 38 and controlling an energizing circuit 10A indicated by a dotted line for an autopilot engage circuit 28B, whereby the autopilot may be disengaged or prevented from engagement only in the event of no power to the gyro motor 43 or failure of energization for the period of time provided by the amplifier 55 and heater 38. The circuit condition for autopilot engagement would be effected upon the required energization of relay 14—32 and thermal relay 24A—38.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. For use with a vertical gyro in an aircraft; the combination comprising a bank angle detector means operative by said gyro vertical, means responsive to the rate of turn of said aircraft, means for detecting a fault in an operating condition, means to control said fault detecting means, means operatively connecting said bank angle detector means and said rate of turn responsive means to said control means, said connecting means including relay means to render said fault detecting means effective in a fault detecting sense upon the rate of turn responsive means failing to sense a rate of turn of the aircraft in excess of a predetermined threshold value while said bank angle detector means senses a bank angle of the gyro vertical in excess of a predetermined threshold value, said relay means including a first relay means operated by said rate of turn responsive means, a second relay means operated by said bank angle detector means, and the control means including a time delay relay means, electric circuit means to operatively connect said first and second relay means to said time delay relay means, and a second electric circuit means to operatively connect said time delay relay means to said control means, and said time delay relay means retarding operation of said control means for a period of time after the aforesaid failure of the rate of turn responsive means.

2. In an aircraft having a gyro vertical operative therein; the combination comprising gyro vertical bank angle detector means, aircraft rate of turn responsive means, a fault indicating means, means to control said fault indicating means, means to operatively connect said bank angle detector means and said rate of turn responsive means to said control means, said connecting means including relay means operative by said first and second mentioned means to effect operation of said fault indicating means in a fault indicating sense upon the rate of turn responsive means failing to sense a rate of turn of the aircraft in excess of a predetermined threshold value while said detector means senses a bank angle of the gyro vertical in excess of a predetermined threshold value.

3. The combination defined by claim 2 in which there is provided a pitch angle detector means including a sensor of dynamic vertical of the aircraft and a sensor of pitch gimbal angle of the gyro vertical, other means to operatively connect said pitch angle detector means to said control means, said other connecting means including relay means operative by said pitch angle detector means to effect operation of said fault indicating means in a fault indicating sense upon the pitch gimbal angle of the gyro vertical exceeding a predetermined threshold value relative to the dynamic vertical of the aircraft.

4. In an aircraft having a gyro vertical operative therein; the combination comprising gyro vertical bank angle detector means, aircraft rate of turn responsive means, means to indicate a faulty operation, means to control said indicating means, first means to operatively connect said bank angle detector means and said rate of turn responsive means to said control means to effect operation of said indicating means in a fault indicating sense upon the rate of turn responsive means failing to sense a rate of turn of the aircraft in excess of a predetermined threshold value while said detector means senses a bank angle of the gyro vertical in excess of a predetermined threshold value, pitch angle detector means including a sensor of dynamic vertical of the aircraft and a sensor of pitch gimbal angle of the gyro vertical, second means to operatively connect said pitch angle detector means to said control means to effect operation of said indicating means in the fault indicating sense upon the pitch gimbal angle of the gyro vertical exceeding a predetermined threshold value relative to the dynamic vertical of the aircraft, electric energy supply means, said electric energy supply means to render said gyro operatively effective, electric energy sensitive means responsive to said supply means and third means to operatively connect said electric energy sensitive means to the control means for the indicating means, and said first, second and third connecting means each including time delay means to render the connecting means ineffective for predetermined delay periods.

5. Apparatus for monitoring an automatic pilot in an aircraft having a gyro vertical operative therein; said apparatus comprising gyro vertical bank angle detector means, aircraft rate of turn responsive means, control means to selectively render said automatic pilot operative and inoperative, means to operatively connect said bank angle detector means and said rate of turn responsive means to said control means, said connecting means including relay means selectively operative by said first and second mentioned means to render said automatic pilot inoperative upon the rate of turn responsive means failing to sense a rate of turn of the aircraft in excess of a predetermined threshold value while said detector means senses a bank angle of the gyro vertical in excess of a predetermined threshold value.

6. The combination defined by claim 5 in which there is provided a pitch angle detector means including a sensor of dynamic vertical of the aircraft and a sensor of pitch gimbal angle of the gyro vertical, said connecting means including means to operatively connect said pitch angle detector means to said control means, and said connecting means including another relay means operative by said pitch angle detector means to cause said control means to effect inoperation of said automatic pilot upon the pitch gimbal angle of the gyro vertical exceeding a predetermined threshold value relative to the dynamic vertical of the aircraft.

7. The combination defined by claim 5 including electric energy supply means, said electric energy supply means to render the gyro operatively effective, electric energy sensitive means responsive to electric energy from said supply means to said gyro, said connecting means including means to operatively connect said electric energy sensitive means to the control means, and said connecting means including another relay means operative by said energy sensitive means to render said automatic pilot inoperative upon a failure in the electric energy from said supply means to said gyro.

8. The combination defined by claim 7 in which said other relay means includes a time delay means to render said electric energy sensitive means ineffective for a predetermined delay period after initiation of the supply of electric energy to the gyro from the electric supply means.

9. In apparatus for monitoring an automatic pilot in an aircraft having a gyro vertical operative therein; the combination comprising gyro vertical bank angle detector means, aircraft rate of turn responsive means, means for indicating a faulty operation, means to control said indicating means and to selectively render said automatic pilot operative and inoperative, first relay means to operatively connect said bank angle detector means and said rate of turn responsive means to said control means, said first relay means selectively operative by said first and second mentioned means to effect operation of said indicating means in a fault warning sense and to render said automatic pilot inoperative upon the rate of turn responsive means failing to sense a rate of turn of the aircraft in excess of a predetermined threshold value while said detector means senses a bank angle of the gyro vertical in excess of a predetermined threshold value, pitch angle detector means including a sensor of dynamic vertical of the aircraft and a sensor of pitch gimbal angle of the gyro vertical, second relay means to operatively connect said pitch angle detector means to said control means, said second relay means operative by said pitch angle detector means to effect operation of said indicating means in a fault warning sense and to render said automatic pilot inoperative upon the pitch gimbal angle of the gyro vertical exceeding a predetermined threshold value relative to the dynamic vertical of the aircraft, electric energy supply means, said electric energy supply means to render the gyro operatively effective, means sensitive to flow of electric energy from said supply means to said gyro, third relay means to operatively connect said electric energy sensitive means to the control means, said third relay means operative by said electric energy supply means to effect operation of the indicating means in a fault warning sense and to render said automatic pilot inoperative upon a failure in the electric energy from said supply means to said gyro, and said first, second and third relay means each including time delay means to render the operation thereof ineffective for predetermined delay periods.

10. In apparatus for monitoring an automatic pilot in an aircraft having a gyro vertical operative therein, the combination comprising gyro vertical bank angle detector means, aircraft rate of turn responsive means, means for indicating a faulty operation, means to control said indicating means, first relay means to operatively connect said bank angle detector means and said rate of turn responsive means to said control means to effect operation of said indicating means in a fault warning sense upon the rate of turn responsive means failing to sense a rate of turn of the aircraft in excess of a predetermined threshold value while said detector means senses a bank angle of the gyro vertical in excess of a predetermined threshold value, pitch angle detector means including a sensor of dynamic vertical of the aircraft and a sensor of pitch gimbal angle of the gyro vertical, second relay means to operatively connect said pitch angle detector means to said control means to effect operation of said indicating means in the fault warning sense upon the pitch gimbal angle of the gyro vertical exceeding a predetermined threshold value relative to the dynamic vertical of the aircraft, electric energy supply means, said electric energy supply means to render the gyro operatively effective, means sensitive to flow of electric energy from said supply means to said gyro, other control means to selectively render said automatic pilot operative and inoperative, third relay means to operatively connect said electric energy sensitive means to the first mentioned control means to effect operation of the indicating means in said fault warning sense upon a failure in the electric energy supply means and said third relay means to operatively connect said electric energy sensitive means to the other control means for the automatic pilot to render said automatic pilot inoperative upon a failure in the electric energy supply means, and said first, second and third relay means each including time delay means to render the operation thereof ineffective for predetermined delay periods.

11. In an aircraft having a gyro vertical operative therein, the combination comprising a bank angle detector means for said gyro vertical, rate of turn responsive means for said aircraft, fault detecting means for detecting a fault in an operating condition, main control means to control said fault detecting means, means operatively connecting said bank angle detector means and said rate of turn responsive means to said main control means, the connecting means including auxiliary control means operative by said first and second mentioned means to effect operation of the main control means and thereby said fault detecting means in a fault detecting sense upon the rate of turn responsive means failing to sense a rate of turn of the aircraft in excess of a predetermined threshold value while said detector means senses a bank angle of the gyro vertical in excess of a predetermined threshold value.

12. The combination defined by claim 11 in which said connecting means includes time delay relay means to retard the operation of said main control means for a preselected period of time after the aforesaid failure of the rate of turn responsive means.

13. The combination defined by claim 11 in which the auxiliary control means includes a first relay means operated by said rate of turn responsive means, a second relay means operated by said bank angle detector means, and the main control means includes a time delay relay means, electric circuit means to operatively connect said first and second relay means to said time delay relay means, said time delay relay means retarding the operation of said main control means for a period of time after the aforesaid failure of the rate of turn responsive means.

14. The combination defined by claim 11 including an indicator means operative by the fault detecting means in a fault warning sense upon the failure of the rate of turn responsive means.

References Cited in the file of this patent

UNITED STATES PATENTS

| | | |
|---|---|---|
| 2,586,034 | Halpert | Feb. 19, 1952 |
| 2,634,391 | Rusler | Apr. 7, 1953 |
| 2,649,264 | Slater et al. | Aug. 18, 1953 |
| 2,674,711 | MacCallum | Apr. 6, 1954 |
| 2,823,877 | Hess | Feb. 18, 1958 |